United States Patent [19]

Grasselli et al.

[11] Patent Number: 4,728,580
[45] Date of Patent: Mar. 1, 1988

[54] AMORPHOUS METAL ALLOY COMPOSITIONS FOR REVERSIBLE HYDROGEN STORAGE

[75] Inventors: Robert K. Grasselli, Aurora; Michael A. Tenhover, Solon; Jonathan H. Harris, Shaker Hts., all of Ohio

[73] Assignee: The Standard Oil Company, Cleveland, Ohio

[21] Appl. No.: 717,428

[22] Filed: Mar. 29, 1985

[51] Int. Cl.$^4$ ............................................... B32D 5/14
[52] U.S. Cl. .................................... 428/610; 428/670; 428/680; 428/660; 148/403; 148/9; 420/900; 420/463; 420/456; 423/644
[58] Field of Search ............... 420/900, 417, 422, 463, 420/465, 456; 423/644, 648; 428/670, 672, 669, 673, 610; 148/403

[56] References Cited

U.S. PATENT DOCUMENTS 4,431,561 2/1984 Ovshinsky et al. .................. 252/184
4,489,049 12/1984 Forester et al. ...................... 423/644
4,637,967 1/1987 Keem et al. .......................... 429/101

FOREIGN PATENT DOCUMENTS 15428 9/1980 European Pat. Off. .
0140693 5/1985 European Pat. Off. .
91736 6/1982 Japan .
2119561 4/1983 United Kingdom .

OTHER PUBLICATIONS

Pick M. A. et al., "Enhancement of Hydrogen Uptake Rates for Nb and Ta by Thin Surface Overlayers" Phy. Rev. Lett., vol. 43, No. 4, Jul. 1979, pp. 286–289.
Kirk–Othmer Encyclopedia, Third Edition, vol. 12, 1980.
Chemical Abstracts 100:106657t "Metal Oxidehydrogen Battery".
A. J. Maeland, "Hydrogen Absorption in Metallic Glasses," from Metal Hydrides, Plenum Publishing Corporation, 1981.
Ivey et al., "Metal Hydrides for Energy Storage," Journal of Materials for Energy Systems, vol. 3, No. 3, 12/81; pp. 3–19.
Bronoel et al., "A New Hydrogen Storage Electrode," International Journal of Hydrogen Energy, vol. 1, 1976, pp. 251–254.
P. D. Goodell, "Stability of Rechargeable Hydriding Alloys During Extended Cycling," Journal of the Less-Common Metals, vol. 99, 1984 pp. 1–14.
Tamura et al., "Hydrogen Evolution at LaNi$_5$-type Alloy Electrodes," Journal of the Less–Common Metals, vol. 89, 1983, pp. 567–574.
Yayama et al., "Electrochemical Hydrogen Storage in Ti–Mn Alloy Electrodes," Japanese Journal of Applied Physics, vol. 22, No. 10, 10/83, pp.–L621–L623.
Schroeder et al., "Hydrogen Embrittlement of Metallic Glasses," Journal of Non-Crystalline Solids, vol. 56, 1983, pp. 213–218.
Maeland et al., "Hydrides of Metallic Glass Alloys," Journal of the Less–Common Metals, vol. 74, 1980, pp. 279–285.
Sinha et al., "Hydrogen Storage Properties of CeNi$_{5-x}$-Al$_x$Alloys," Journal of Physical Chemistry, vol. 88, 1/5/84, pp. 102–107.
Chemical Abstracts 100:142237q "Hydrogen–Absorbing Battery Anodes.
Chemical Abstracts 100:124092j "Metal Oxide–Hydrogen Batteries".

Primary Examiner—Christopher W. Brody
Attorney, Agent, or Firm—Sue E. Phillips; Joseph G. Curatolo; Larry W. Evans

[57] ABSTRACT

Novel materials having the ability to reversibly store hydrogen are amorphous metal alloys of the formula $$A_a M_b M'_c$$

wherein

A is at least one metal selected from the group consisting of Ag, Au, Hg, Pd and Pt;

M is at least one metal selected from the group consisting of Pb, Ru, Cu, Cr, Mo, Si, W, Ni, Al, Sn, Co. Fe, Zn, Cd, Ga and Mn; and M' is at least one metal selected from the group consisting of Ca, Mg, Ti, Y, Zr, Hf, Nb, V, Ta and the rare earths; and wherein a ranges from greater than zero to about 0.80;
b ranges from zero to about 0.70; and
c ranges from about 0.08 to about 0.95;

characterized in that (1) a substantial portion of A is disposed on the surface of said material and/or (2) that said material functions as an active surface layer for adsorbing/desorbing hydrogen in conjunction with a bulk storage material comprising a reversible hydrogen storage material.

27 Claims, No Drawings

AMORPHOUS METAL ALLOY COMPOSITIONS FOR REVERSIBLE HYDROGEN STORAGE

FIELD OF THE INVENTION

The present invention relates to improved amorphous metal alloy compositions and structures capable of reversible hydrogen storage. These compositions are capable of efficiently cyclically storing and releasing relatively large quantities of hydrogen without becoming embrittled, inactivated or corroded.

BACKGROUND OF THE INVENTION

Shortages of fossil fuel materials in the recent past has spurred much speculation regarding the feasibility of economies based on other energy sources. One such scenario is a hydrogen-fueled economy. Hydrogen has the highest energy density per unit weight of any chemical. Many projections have been made for an economy based on this element, but the technology is not yet in place to effect such a dramatic change in the world economy. Hydrogen is, however, a technically attractive source of fuel and energy storage. It is essentially non-polluting, the major by-product of combustion being $H_2O$, and can be made from readily available and abundant raw materials.

While it is well known that hydrogen can be stored as a compressed gas or cryogenically as a liquid, other less energy-intensive and more convenient means are required for widespread utilization of hydrogen as a source of stored energy. It is known that some metals and metal alloys are capable of storing hydrogen reversibly within their lattice. This characteristic may be exploited by exposing the metal or metal alloy to a large pressure of hydrogen, impregnating the metal or metal alloy with hydrogen and later recovering the stored hydrogen by subjecting the impregnated metal or alloy to a change in temperature or pressure.

This characteristic of reversible hydrogen storage for some alloys is also being applied in an electrochemical environment. A metal or metal alloy suitable as a hydrogen storage material may be cathodically biased relative to a suitable counter electrode and charged with hydrogen by the reduction of a proton from solution. Metal alloy systems that have been studied for electrochemical hydrogen storage include $LaNi_5$-based, TiMn-based, FeTi-based and Mg-based alloys. Although some of these crystalline materials store appreciable quantities of hydrogen, these same crystalling materials are susceptible to phase separation, hydrogen embrittlement and surface oxidation when used in charge-discharge cycles for hydrogen storage. Phase separation occurs in crystalline alloys that are subjected to hydrogen cycling, wherein the alloy components separate and migrate throughout the alloy. In $LaNi_5$-type alloys, La migrates to the surface of the alloy, where it may rapidly become oxidized.

Hydrogen embrittlement occurs in crystalline alloys as hydrogen is absorbed and desorbed. Hydrogen storage proceeds from the surface of the alloy to its interior, with hydrogen atoms breaking into the interstitial site of metal matrix atoms and then expanding the lattice. As a result internal stresses may produce flaws and cracks, seriously weakening and embrittling the metal or metal alloy. Surface oxidation may occur if the hydrogen storage material is exposed to oxidative conditions in the presence of an oxidant such as $CO_2$, $H_2O$, KOH, air or oxygen. Surface oxidation interferes with the penetration of hydrogen, reducing the amount of hydrogen absorbed and the rate of absorption. Additionally, these crystalline materials generally cannot withstand corrosive environments, which environments may exist when the materials are utilized in an electrochemical reaction.

Recently, amorphous metal alloy materials have been reported as having the ability to store hydrogen reversibly. Amorphous metal alloy materials have become of interest due to their unique combinations of mechanical, chemical and electrical properties. Amorphous metal materials have compositionally variable properties including high hardness and strength, flexibility, soft magnetic and ferroelectronic properties, very high resistance to corrosion and wear, unusual alloy compositions, and high resistance to radiation damage. The unique combinations of properties possessed by amorphous metal alloy materials may be attributed to the disordered atomic structure of amorphous materials that insures that the material is chemically homogeneous and free from the extended defects that are known to limit the performance of crystalline materials.

Amorphous metal alloy systems of TiCu and ZrCu were investigated and contrasted with the absorption properties of the corresponding crystalline intermetallic compounds by Maeland, et al., "Hydrides of Metallic Glass Alloys," Journal of the Less-Common Metals, 74, pp. 279–285, 1980. Amorphous metal alloy compositions, under similar conditions of temperature and pressure were capable of absorbing larger amounts of hydrogen than their crystalline counterparts. Maeland, et al. restricted their studies to the gasous absorption of hydrogen in a hydrogen atmosphere. Novel amorphous metal compositions for reversible hydrogen storage are disclosed in Applicants' co-pending patent application, U.S. Ser. No. 717,429, which disclosure is incorporated herein by reference. This disclosure teaches reversible hydrogen storage materials comprising an amorphous metal alloy of the formula:

$$A_a M_b M'_c$$

wherein

A is at least one metal selected from the group consisting of Ag, Au, Hg, Pd and Pt;

M is at least one metal selected from the group consisting of Pb, Ru, Cu, Cr, Mo, Si, W, Ni, Al, Sn, Co, Fe, Zn, Cd, Ga and Mn; and M' is at least one metal selected from the group consisting of Ca, Mg, Ti, Y, Zr, Hf, Nb, V, Ta and the rare earths; and wherein a ranges from about 0.005 to about 0.80;

b ranges from about 0.05 to about 0.70; and c ranges from about 0.08 to about 0.95.

These amorphous compositions are not affected by phase separation or hydrogen embrittlement. Further, the above amorphous compositions have the ability to store from about 0.35 to more than about 1.1 hydrogen atoms per molecule of alloy and do not exhibit any significant signs of surface passivation or corrosion after repeated hydrogen charge/discharge cycles. However, the A component of these compositions is a necessary component of these amorphous alloys, comprising from about one-half to about eighty atomic percent of the alloy, preferably from about ten to about fifty atomic percent and most preferably from about one-half to about forty atomic percent. While the properties of these alloys are ideal for reversible hydrogen storage, their component costs may be prohibitive for widespread applications, especially the A component cost.

Thus it is seen that the potential continues to exist for significant new technological advances in the application of amorphous metal alloys to the development of hydrogen as a fuel and a source of stored energy, especially in the area of electrochemical reversible hydrogen storage. What is needed in this area are economical amorphous metal alloy compositions having the ability to reversibly store hydrogen in significant quantities. Such amorphous metal alloys should not suffer significantly from phase separation or hydrogen-caused embrittlement, nor be susceptible to surface oxidation or corrosion.

It is therefore one object of the present invention to provide economical and improved amorphous metal alloy compositions and structures capable of reversibly storing hydrogen.

It is an additional object of the present invention to provide economical amorphous metal alloy compositions and structures capable of reversibly storing hydrogen in a cyclical fashion without becoming embrittled or suffering from a phase separation.

It is yet another object of the present invention to provide economical amorphous metal alloy compositions and structures capable of reversibly storing hydrogen in a cyclical manner that are not impaired by surface oxidation or corrosion.

These and other objects of the present invention will become obvious to one skilled in the art in the following description of the invention and in the appended claims.

SUMMARY OF THE INVENTION

The present invention is directed toward a reversible hydrogen storage material comprising an amorphous metal alloy of the formula:

$$A_a M_b M'_c$$ 

wherein
A is at least one metal selected from the group consisting of Ag, Au, Hg, Pd and Pt;
M is at least one metal selected from the group consisting of Pb, Ru, Cu, Cr, Mo, Si, W, Ni, Al, Sn, Co, Fe, Zn, Cd, Ga and Mn; and
M' is at least one metal selected from the group consisting of Ca, Mg, Ti, Y, Zr, Hf, Nb, V, Ta and the rare earths; and
wherein
a ranges from greater than zero to about 0.80;
b ranges from zero to about 0.70; and
c ranges from about 0.08 to about 0.95;
the material characterized in that a substantial portion of the A component of the alloy is disposed on the surface of the material.

The invention further relates to a reversible hydrogen storage structure having an active hydrogen absorption surface layer and a bulk hydrogen storage material, the active surface layer comprising an amorphous metal alloy of the formula:

$$A_a M_b M'_c$$

wherein
A is at least one metal selected from the group consisting of Ag, Au, Hg, Pd and Pt;
M is at least one metal selected from the group consisting of Pb, Ru, Cu, Cr, Mo, Si, W, Ni, Al, Sn, Co, Fe, Zn, Cd, Ga and Mn; and
M' is at least one metal selected from the group consisting of Ca, Mg, Ti, Y, Zr, Hf, Nb, V, Ta and the rare earths; and
wherein
a ranges from about 0.005 to about 0.80;
b ranges from zero to about 0.70; and
c ranges from about 0.08 to about 0.95; and
the bulk storage material comprising a reversible hydrogen storage material.

Preferably, in the formular $A_a M_b M'_c$  A is Pd, Pt or combinations thereof, and M is an element selected from the group consisting of Mn, Ru, Fe, Cu, Ni, Cr, Mo, Al, W and combinations thereof. Most preferably, M is an element selected from the group consisting of Mc, Cu, Ni, Fe, Mo, Cr, W and combinations thereof, and M' is titanium, magnesium, tantalum or a combination thereof. By combinations is meant mixtures and/or alloys of the above-listed elements.

Preferably, the ranges of a, b and c when the A component is concentrated on the surface of the material are from greater than zero to about 0.5; from about 0.1 to about 0.5; and from about 0.2 to about 0.85, respectively. Most preferably, the ranges of a, b and c are from about 0.0001 to about 0.2; from about 0.2 to about 0.4 and from about 0.3 to about 0.8, respectively.

DETAILED DESCRIPTION OF THE INVENTION

The compositions and structures described herein are characterized by utilizing graded or layered hydrogen storage compositions that include an active surface for absorbing and desorbing hydrogen and a bulk interior for hydrogen storage.

The amorphous metal alloys discussed herein are substantially amorphous. By "substantially" is meant that the amorphous metal alloys are at least fifty percent amorphous, as indicated by X-ray diffraction analysis. Preferably, the metal alloy is at least eighty percent amorphous, and most preferably about one hundred percent amorphous, as indicated by X-ray diffraction analysis. The use of the phrase "amorphous metal alloy" refers to amorphous metal-containing alloys that may also comprise non-metallic elements.

Hydrogen storage, especially electrochemical hydrogen storage, involves two phenomena; surface electrochemistry and bulk hydrogen interstitial hydrogen storage. An active hydrogen absorption surface also acts as an interface between the absorbed hydrogen and the bulk stored hydrogen atoms, and the electrochemical potential of the active surface establishes a portion of the potential difference through which electrons are accelerated during charge and discharge.

As an interface, the active surface must effectively supply the bulk with atomic hydrogen during charging and keep this hydrogen in the material until discharge. A metalalic surface, wherein the charge transfer reaction ($H^+ + e^- = H$) is very rapid yet the recombination reaction ($2H_{(bulk)} \rightarrow H_{2(gas)}$) is slow, is ideal for an active hydrogen absorbing surface. This combination of properties increases the amount of hydrogen that is transferred as atomis hydrogen to the bulk and reduces the amount of gaseous hydrogen lost in solution. As taught by P. K. Subnamanyan, "Electrochemical Aspects of Hydrogen in Metals", in *Comprehensive Treatise of Electrochemistry*, Plenum Press, N.Y. 1981, the following metals have faster charge transfer kinetics than recombination kinetics: Ti, Nb, Mo, Ta, W, Cu, Al, Au, Bi, Rh, Ir, Pt, Pd and Ag.

The role of the bulk material is to store as many hydrogen atoms as possible reversibly, so as to keep the surface coverage of absorbed hydrogen constant. Though some pure metals with slightly negative heats of formation for the hydride, such as Pd or Ni, will store small amounts of hydrogen reversibly; significantly more hydrogen can be stored in a suitable metallic alloy. In generaly, alloying components are chosen such that a balance is reached between materials with positive and negative hydride heats of formation. In this way, hydrogen may sit in interstitial sites in the metallic alloy lattice. The balance of alloying components is important since this determines the depth of the potential well in which hydrogen is situated, and thus controls the kinetics of hydrogen diffusion from one interstitial site to the next.

A second consideration in choosing a bulk hydrogen storage alloy composition is that of mechanical stability. Many metallic alloys that store substantial amounts of hydrogen become tremendously embrittled as hydrogen is incorporated into their lattice.

This lack of mechanical integrity may not be critical in some applications, such as when the hydrogen storage material is in the form of a pressed powder. However, if the hydrogen storage material must have mechanical integrity, as when the active hydrogen storing alloy is applied as a coating or as a free standing film, an alloy must be chosen where this embrittlement does not occur.

In one embodiment of this invention, the amorphous metal alloy compositions taught in U.S. Ser. No. 717,429, discussed above, are graded such that a substantial portion of the A component of the composition is disposed on the surface of the amorphous metal alloy composition. By "substantial" is meant that at least fifty percent of the A component is disposed on the surface of the amorphous composition. Preferably, at least seventy-five percent of the A component is disposed on the surface of the amorphous composition, and most preferably about one hundred percent of the A component is disposed on the surface. The phrase "on the surface" refers to disposing the A component on or near the surfaces of the alloy structure that will come in contact with hydrogen available for absorption into the alloy. Thus, "on the surface" embodies any location in the alloy structure wherein the A component may actively adsorb and/or desorb hydrogen into and/or out of the alloy. In this way, the A component in the composition functions as a highly effective interface material, having fast charge transfer kinetics and permitting relatively few recombination reactions to occur. The interior portion of the amorphous metal alloy composition comprises predominantly M and M' element of the alloy which are highly effective hydrogen storage materials. By concentrating the A component on the surface of the amorphous metal alloy composition, the A component is most effectively utilized for hydrogen storage. Preferably, the A component is Pd, Pt or a combination thereof. In accordance with the present invention, it is now possible to obtain efficient reversible hydrogen storage compositions having the hydrogen storage ability of the previously taught $A_aM_bM'_c$ compositions in U.S. Ser. No. 717,429 and their attendant mechanical stability and resistivity to oxidation and corrosion while at the same time utilizing much smaller quantities of the more expensive a component. This improvement significantly reduces the material costs of such compositions and so increases the feasibility of their use and the potential applications for such materials to store hydrogen.

A second embodiment of the present invention comprises an active surface layer having an amorphous metal alloy composition of the formula $A_aM_bM'hd c$ 

wherein

A is at least one metal selected from the group consisting of Ag, Au, Hg, Pd and Pt;

M is at least one metal selected from the group consisting of Pb, Ru, Cu, Cr, Mo, SI, W, Ni, Al, Sn, Co, Fe, Zn, Cd, Ga and Mn; and M' is at least one metal selected from the group consisting of Ca, Mg, Ti, Y, Zr, Hf, Nb, V, Ta and the rare earths; and wherein a ranges from about 0.005 to about 0.80;

b ranges from zero to about 0.70; and c ranges from about 0.08 to about 0.95.

This layer is in intimate contact with a second material that is a reversible bulk hydrogen storage material.

In this embodiment, the ranges of a, b and c are preferably from about 0.01 to about 0.75, from about 0.1 to about 0.5, and from about 0.2 to about 0.85, respectively. Most preferably, the ranges of a, b and c are from about 0.2 to about 0.7, from about 0.2 to about 0.4 and from about 0.3 to about 0.8, respectively.

The bulk storage material may comprise any recognized hydrogen storage material such as those amorphous metal alloys that are utilized in the active layer, other amorphous metal alloys known to reversibly store hydrogen, and crystalline materials known to reversibly store hydrogen. The material used as this bulk hydrogen storage material need not include an A component in its composition. The bulk storage layer may comprise materials that are highly efficient hydrogen storage materials, but that do not withstand surface passivation or corrosion, as the active surface layer shields the bulk hydrogen storage material from detrimental environmental conditions such as oxidative and corrosive conditions. The bulk storage material, if it need not be mechanically stable, may also comprise materials that are susceptible to phase separation and hydrogen embrittlement, as these characteristics will not significantly effect the bulk hydrogen storage efficiency of the cell.

The compositions and structures of the present invention may exist as powders or solids. It is within the scope of the present invention to include powder materials wherein the intended composition and structure comprises individual amorphous hydrogen storage particles having a composition as described herein above by the formula $A_aM_bM'_c$ and wherein the A component of the compositon is concentrated on the surface of each particle. It is also within the scope of the present invention to include a powder material comprising a core of a reversible hydrogen storage material coated with the amorphous hydrogen storage materials of the formula $A_aM_bM'_c$ that are described herein as well-suited for the active surface layer.

Alternatively, a structure in accordance with this invention may comprise packed particles of a bulk hydrogen storage material covered with an active layer or coating of the amorphous hydrogen storage materials described herein.

Also within the scope of the invention is a solid structure having an amorphous metal alloy composition of the formula $A_aM_bM'_c$ wherein the A component of the composition is concentrated on the active surface of the structure, and structures having a core of any reversible hydrogen storage material that is then coated on its exposed active surfaces with the amorphous hydrogen storage compositions described herein. Hydrogen storage structures are also envisioned wherein the $A_aM_bM'_c$ amorphous metal alloy compositions described herein are deposited onto a substrate. The amorphous metal alloy composition may have an A component concentration on its active surface and/or may have another reversible hydrogen storage material disposed between the amorphous metal alloy composition and the substrate.

These compositions and structures can be prepared by any of the standard techniques for fabricating such materials. With respect to fabricating amorphous metal alloys, physical and chemical methods such as electron beam deposition, ion implantation, chemical reduction, thermal decomposition, ion cluster depostion, ion plating, liquid quenching, solid state diffusion, RF and DC sputtering may be utilized to form the compositions herein. One or more methods may be combined advantageously to produce the composite structures taught herein. The A component of a compositon may be concentrated on the surface of an amorphous metal alloy by first producing the desired metal alloy composition absent the A component, then depositing the A component onto the surface of the formed composition, and annealing this structure to form the desired amorphous metal alloy.

An example of this method which can be utilized to produce an extremely low, and uniformly dispersed, concentration of the A component on the surface of the amorphous metal alloy composition is to immerse a film or powder comprising the desired alloy composition absent the A component in an environment where the A component is dilutely present and can be deposited onto the film or powder, such as a solution containing an A-bearing compound therein. Once the A component or A-bearing compound has settled onto the alloy film or powder, then the film or powder may be heat treated to form the desired amorphous metal alloy composition, the heat treating occurring at a temperature below the crystallization temperature of the amorphous metal alloy.

To insure the desired hydrogen storage properties of the amorphous metal alloy material disclosed herein, it is intended that these materials be exposed to an environment wherein the temperature of the alloy does not reach or exceed its crystallization temperature.

The presence of other elements as impurities in the compositions taught herein is not expected to seriously impair the ability of these compositions to reversibly store hydrogen. Thus, trace impurities such as O, N, C, S, Se, Te, B, P, Ge, Sb, As and Ar are not expected to be seriously detrimental to the preparation and performance of these compositions.

The following examples demonstrate the hydrogen storage ability of the compositions and structures described in the present invention. It is to be understood that these examples are utilized for illustrative purposes only, and are not intended in any way, to be limitative of the present invention.

EXAMPLES

EXAMPLE 1

This example demonstrates the formation of a graded structure in accordance with the invention wherein the A component of the desired amorphous metal alloy is concentrated on the surface of the alloy by first depositing the M and M' components of the composition onto a substrate, then depositing the A component thereon, and finally annealing the structure to form the desired amorphous metal alloy composition.

A layer, about 4,000 Angstroms thick, of $Ni_{40}Ti_{60}$ was sputtered onto a titanium substrate in a vacuum. Thereafter, without breaking the vacuum, about 1,500 Angstroms of palladium was evaporated onto the $Ni_{40}Ti_{60}$ layer. This structure was then heat treated at about 300° C. for about 12 hours. The resulting structure comprised a bulk hydrogen storage layer of $Ni_{40}Ti_{60}$, an amorphous graded composition of Pd-Ni-Ti, with a palladium concentration graded from zero to about 0.80, and excess crystalline Pd.

This structure was utilized as an electrode in an electrolytic cell opposite a nickel hydroxide counter electrode. The electrolyte in the cell was potassium hydroxide. The hydrogen electrode was cyclically charged at about 1 mA until the cell voltage stabilized, and then discharged at about 0.1 mA. The electrode was charged and discharged about 20 times, after which the efficiency of the hydrogen electrode was calculated in terms of a charge density measured as a charge-per-weight (mA-hr/gm) and a charge-per-volume (mA-hr/cm3). The electrode was seen to have a charge density of about 217 mA-hr/gm and about 1697 mA-hr/cm$^3$.

EXAMPLE 2

This example demonstrates the formation of a reversible hydrogen storage structure having an active hydrogen absorption surface disposed on a bulk hydrogen storage material. The active hydrogen storage layer is of the form $A_aM'_c$.

A layer, about 6,000 Angstroms thick, of an amorphous alloy having an approximate composition $Fe_{40}Ti_{60}$ was sputtered on a titanium substrate in a vacuum. While maintaining the vacuum, a layer of about 790 Angstroms thick of an amorphous alloy, $Pd_{40}Ti_{40}$, was sputtered on the $Fe_{40}Ti_{60}$ layer.

This structure was then used as a hydrogen storage electrode in a cell having an electrolyte of 2N $H_3PO_4$ and a counter electrode of graphite. The hydrogen storage electrode had an active surface area of about 1.5 cm$^2$. The hydrogen electrode was cyclically charged at about 1 mA until the cell voltage stabilized, and then discharged at about 0.1 mA. The efficiency of the hydrogen electrode was calculated in terms of a charge density and found to be about 143 mA-hr/gm on a charge-per-weight basis and about 875 mA-hr/cm3 on a charge-per-volume basis.

EXAMPLE 3

This example demonstrates a process for obtaining a compostion in accordance with the above teaching wherein the amount of the A component is extremely low.

A splat-cooled foil of amorphous $Ni_{64}Hf_{36}$, about 40 microns thick, was etched in a 1 percent aqueous hydrogen fluoride solution for about 1 minute and then dipped into a dilute palladium chloride-containing solution for ten seconds. The palladium chloride-containing solution comprised about 40 ml of concentrated HCl and 1 gm of palladium chloride per liter of water. A small amount of palladium settled on the $Ni_{64}Hf_{36}$ foil during this dipping process. The foil was then heat treated in a vacuum at about 275° C. for about 48 hours. The resultant material was found to be an amorphous material having an approximate composition of $Pd_{0.001}Ni_{64}Hf_{36}$.

This composition was used as a hydrogen storage electrode in an electrolytic cell, the hydrogen storage electrode having an active surface area of about 1.5 $cm^2$. The electrolytic cell also employed a nickel hydroxide counter electrode and an electrolyte of potassium hydroxide. After about 60 charge/discharge cycles, the efficiency of the hydrogen electrode was calculated in terms of a charge density and found to be about 54 mA-hr/gm on a charge-per-weight basis and about 645 mA-hr/$cm^3$ on a charge-per-volume basis.

The reversible hydrogen storage ability of the amorphous metal alloy compositions taught herein provide heretofor unattainable hydrogen storage ability, resistance to oxidation, and stability in economically feasible compositions and so represent a substantial advancement to hydrogen storage and its anciliary technologies and applications.

Thus, it is believed that any of the variable disclosed herein can readily be determined and controlled without departing from the spirit of the invention herein disclosed and described. Moreover, the scope of the invention shall include all modifications and variations that fall within the scope of the attached claims.

Although several amorphous metal alloy compositions have been exemplified herein, it will readily be appreciated by those skilled in the art that other amorphous metal alloys falling within the scope of the compositions described herein as well-suited for reversibly stored hydrogen could be substituted therefore.

It is to be understood that the foregoing examples have been provided to enable those skilled in the art to have representative examples by which to evaluate the invention and that these examples should not be construed as any limitation on the scope of this invention. Inasmuch as the composition of the amorphous metal alloys employed in the present invention and their graded and/or layered structure can be varied within the scope of the total specification disclosure, neither the particular A, M or M' components nor the relative amounts of the components in the alloys exemplified herein shall be construed as limitations of the invention.

We claim:

1. A reversible hydrogen storage material comprising a substantially amorphous metal alloy of the formula:

$$A_aM_bM'_c$$

wherein
A is at least one metal selected from the group consisting of Ag, Au, Hg, Pd and Pt;
M is at least one metal selected from the group consisting of Pb, Ru, Cu, Cr, Mo, Si, W, Ni, Al, Sn, Co, Fe, Zn, Cd, Ga and Mn; and
M' is at least one metal selected from the group consisting of Ca, Mg, Ti, Y, Zr, Hf, Nb, V, Ta and the rare earths; and
wherein
a ranges from greater than zero to about 0.80;
b ranges from zero to about 0.70; and
c ranges from about 0.08 to about 0.95;
said material having a compositional gradient wherein a substantial portion of the A component of said alloy is disposed on or near the surface of said material that will come in contact with hydrogen available for absorption.

2. The reversible hydrogen storage material in accordance with claim 1 wherein A is Pd, Pt or a combination thereof.

3. The reversible hydrogen storage material in accordance with claim 1 wherein M is at least one metal selected from the group consisting of Mn, Ru, Fe, Cu, Ni, Cr, Mo, Al and W.

4. The reversible hydrogen storage material in accordance with claim 1 wherein M is at least one metal selected from the group consisting of Mn, Cu, Ni, Fe, Mo, Cr, W.

5. The reversible hydrogen storage material in accordance with claim 1 wherein M' is titanium, magnesium, tantalum or a combination thereof.

6. The reversible hydrogen storage material in accordance with claim 1 wherein a ranges from greater than zero to about 0.5; b ranges from about 0.1 to about 0.5; and c ranges from about 0.2 to about 0.85.

7. The reversible hydrogen storage material in accordance with claim 1 wherein a ranges from about 0.001 to about 0.2; b ranges from about 0.2 to about 0.4; and c ranges from about 0.3 to about 0.8.

8. The reversible hydrogen storage material in accordance with claim 1 wherein at least fifty percent of said A component is disposed on the surface of said material.

9. The reversible hydrogen storage material in accordance with claim 1 wherein at least seventy-five percent of said A component is disposed on the surface of said material.

10. The reversible hydrogen storage material in accordance with claim 1 wherein about one hundred percent of said A component is disposed on the surface of said material.

11. A reversible hydrogen storage structure having an active hydrogen absorption surface layer said layer having an outside surface and an interface surface, and a bulk hydrogen storage material in contact with said surface layer at said interface surface, the active surfacd layer comprising a substantially amorphous metal alloy of the formula:

$$A_aM_bM'_c$$

wherein
A is at least one metal selected from the group consisting of
Ag, Au, Hg, Pd and Pt;
M is at least one metal selected from the group consisting of
Pb, Ru, Cu, Cr, Mo, Si, W, Ni, Al, Sn, Co, Fe, Zn, Cd, Ga and Mn; and
M' is at least one metal selected from the group consisting of
Ca, Mg, Ti, Y, Zr, Hf, Nb, V, Ta and the rare earths; and
wherein
a ranges from about 0.005 to about 0.80;
b ranges from about zero to about 0.70; and
c ranges from about 0.08 to about 0.95;
the surface layer having a compositional gradient wherein a substantial portion of the A component of said alloy is disposed on the outside surface of said surface layer, the bulk storage material comprising a reversible hydrogen storage material.

12. The reversible hydrogen storage structure in accordance with claim 11 wherein A is Pd, Pt or a combination thereof.

13. The reversible hydrogen storage structure in accordance with claim 11 wherein M is at least one metal selected from the group consisting of Mn, Ru, Fe, Cu, Ni, Cr, Mo, Al and W.

14. The reversible hydrogen storage structure in accordance with claim 11 wherein M is at least one metal selected from the group consisting of Mn, Cu, Ni, Fe, Mo, Cr, W.

15. The reversible hydrogen storage structure in accordance with claim 11 wherein M' is titanium, magnesium, tantalum or a combination thereof.

16. The reversible hydrogen storage structure in accordance with claim 11 wherein a ranges from 0.01 to about 0.75; b ranges from about 0.1 to about 0.5; and c ranges from about 0.2 to about 0.85.

17. The reversible hydrogen storage structure in accordance with claim 11 wherein a ranges from about 0.02 to about 0.7; b ranges from about 0.2 to about 0.4; and c ranges from about 0.3 to about 0.8.

18. The reversible hydrogen storage structure in accordance with claim 11 wherein said bulk storage material comprises an amorphous material capable of reversible hydrogen storage.

19. The reversible hydrogen storage structure in accordance with claim 11 wherein said bulk storage material comprises a crystalline material capable of reversible hydrogen storage.

20. A material for reversibly storing hydrogen comprising a substantially amorphous metal alloy having the formula:

$$Pd_a Ni_b Zr_c$$

where
a ranges from greater than zero to about 0.8,
b ranges from greater than zero to about 0.7,
c ranges from about 0.08 to about 0.95, and
a plus b plus c equals about 1.00, wherein the alloy is compositionally graded so that a substantial portion of the palladium is disposed on the surface of the alloy.

21. A material for reversibly storing hydrogen comprising a substantially amorphous metal alloy having the formula;

$$Pt_a Ni_b Zr_c$$

where
a ranges from greater than zero to about 0.8,
b ranges from greater than zero to about 0.7,
c ranges from about 0.08 to about 0.95, and
a plus b plus c equals about 1.00, wherein the alloy is compositionally graded so that a substantial portion of the platinum is disposed on the surface of the alloy.

22. A material for reversibly storing hydrogen comprising a substantially amorphous metal alloy having the formula:

$$Pd_a Ni_b Ti_c$$

where a ranges from greater than zero to about 0.8,
b ranges from greater than zero to about 0.7,
c ranges from about 0.08 to about 0.95, and a plus b plus c equals about 1.00, wherein the alloy is compositionally graded so that a substantial portion of the palladium is disposed on the surface of the alloy.

23. A material for reversibly storing hydrogen comprising a substantially amorphous metal alloy having the formula;

$$Pt_a Ni_b Ti_c$$

where
a ranges from greater than zero to about 0.8,
b ranges from greater than zero to about 0.7,
c ranges from about 0.08 to about 0.95, and
a plus b plus c equals about 1.00, wherein the alloy is compositionally graded so that a substantial portion of the platinum is disposed on the surface of the alloy.

24. A structure for reversibly storing hydrogen including an active hydrogen absorption surface layer said layer having an outside surface for contacting hydrogen and an interface surface, and a bulk hydrogen storage material in contact with said active surface layer at said interface surface, the active surface layer comprising a substantially amorphous metal alloy having the formula $$Pd_a Ni_b Zr_c$$

where
a ranges from about 0.005 to about 0.80,
b ranges from greater than zero to about 0.70,
c ranges from about 0.08 to about 0.95, and
a plus b plus c equals about 1.00, wherein the surface layer has a compositional gradient such that a substantial portion of the palladium of said alloy is disposed on the outside surface of said active surface layer, the bulk storage material comprising a material that can reversibly store hydrogen.

25. A structure for reversibly storing hydrogen including an active hydrogen absorption surface layer said layer having an outside surface for contacting hydrogen and an interface surface, and a bulk hydrogen storage material in contact with said active surface layer at said interface surface, the active surface layer comprising a substantially amorphous metal alloy having the formula $$Pt_a Ni_b Zr_c$$

where
a ranges from about 0.005 to about 0.80,
b ranges from greater than zero to about 0.70,
c ranges from about 0.08 to about 0.95, and
a plus b plus c equals about 1.00, wherein the surface layer has a compositional gradient such that a substantial portion of the platinum of said alloy is disposed on the outside surface of said active surface layer, the bulk storage material comprising a material that can reversibly store hydrogen.

26. A structure for reversibly storing hydrogen having an active hydrogen absorption surface layer said layer having an outside surface for contacting hydrogen and an interface surface, and a bulk hydrogen storage material in contact with said active surface layer at said interface surface, the active surface layer comprising a substantially amorphous metal alloy having the formula $$Pd_a Ni_b Ti_c$$

where a ranges from about 0.005 to about 0.80,
b ranges from greater than zero to about 0.70,
c ranges from about 0.08 to about 0.95, and
a plus b plus c equal about 1.00, wherein the surface layer has a compositional gradient such that a substantial portion of the palladium of said alloy is disposed on the outside surface of said active surface layer, the bulk storage material comprising a material that can reversibly store hydrogen.

27. A structure for reversibly storing hydrogen having an active hydrogen absorption surface layer said layer having an outside surface for contacting hydrogen and an interface surface, and a bulk hydrogen storage material in contact with said active surface layer at said interface surface, the active surface layer comprising a substantially amorphous metal alloy having the formula $$Pt_a Ni_b Ti_c$$

where
a ranges from about 0.005 to about 0.80,
b ranges from greater than zero to about 0.70,
c ranges from about 0.08 to about 0.95, and
a plus b plus c equals about 1.00, wherein the surface layer has a compositional gradient such that a substantial portion of the platinum of said alloy is disposed on the outside surface of said active surface layer, the bulk storage material comprising a material that can reversibly store hydrogen.

* * * * *